US009600759B2

United States Patent
Ronneberger et al.

(10) Patent No.: US 9,600,759 B2
(45) Date of Patent: Mar. 21, 2017

(54) RFID IDENTIFICATION OF METAL INTERCHANGEABLE PARTS FOR MACHINE TOOLS

(71) Applicant: REISHAUER AG, Wallisellen (CH)

(72) Inventors: Erich Ronneberger, Laufenburg/Baden (DE); Markus Gretler, Hedingen (CH); Roland Küng, Wolfhausen (CH); Daniel Früh, Seuzach (CH)

(73) Assignee: REISHAUER AG, Wallisellen (CH)

( * ) Notice: Subject to any disclaimer, the term of this patent is extended or adjusted under 35 U.S.C. 154(b) by 0 days.

(21) Appl. No.: 14/916,841

(22) PCT Filed: Sep. 11, 2014

(86) PCT No.: PCT/EP2014/069460
§ 371 (c)(1),
(2) Date: Mar. 4, 2016

(87) PCT Pub. No.: WO2015/036519
PCT Pub. Date: Mar. 19, 2015

(65) Prior Publication Data
US 2016/0217364 A1 Jul. 28, 2016

(30) Foreign Application Priority Data

Sep. 12, 2013 (DE) .................... 10 2013 110 055

(51) Int. Cl.
*G06K 19/077* (2006.01)
*G06K 19/04* (2006.01)
(Continued)

(52) U.S. Cl.
CPC ........ *G06K 19/07779* (2013.01); *B23F 23/06* (2013.01); *B23F 23/1225* (2013.01);
(Continued)

(58) Field of Classification Search
None
See application file for complete search history.

(56) References Cited

U.S. PATENT DOCUMENTS

2006/0014475 A1 1/2006 Sekiya
2006/0016269 A1 1/2006 Trionfetti et al.
2007/0199983 A1* 8/2007 Thyssen .................. B23F 23/00
235/375

FOREIGN PATENT DOCUMENTS

DE         44 32 808 A1    3/1995
DE    10 2006 008395 A1    8/2007
(Continued)

OTHER PUBLICATIONS

International Preliminary Report on Patentability dated Mar. 24, 2016 for PCT/EP2014/069460.
(Continued)

*Primary Examiner* — Kristy A Haupt
(74) *Attorney, Agent, or Firm* — Sughrue Mion, PLLC

(57) ABSTRACT

A machine tool comprises a first component, for example a dressing spindle (3), and at least one second component, for example a dressing wheel (1), which is removably and/or movably arranged on the first component. The first component has a first antenna coil for a wireless signal transmission, and the second component has a second antenna coil. The two components together delimit a cavity which is completely surrounded by metal. The first antenna coil and the second antenna coil are arranged together in the cavity. This forms a metal-protected radio link (26.1) between the first antenna coil and the second antenna coil, which radio link is protected from harmful external influences.

47 Claims, 11 Drawing Sheets

(51) Int. Cl.
*B23Q 1/00* (2006.01)
*B23F 23/06* (2006.01)
*B23F 23/12* (2006.01)
*G06K 19/07* (2006.01)

(52) U.S. Cl.
CPC ........ *B23F 23/1237* (2013.01); *B23Q 1/0009* (2013.01); *G06K 19/04* (2013.01); *G06K 19/0723* (2013.01)

(56) References Cited

FOREIGN PATENT DOCUMENTS

| | | |
|---|---|---|
| DE | 60 2004 005 201 T2 | 12/2007 |
| DE | 10 2012 219 099 A1 | 4/2014 |
| DE | 10 2013 100 979 B3 | 5/2014 |
| EP | 1 339 014 A1 | 8/2003 |
| EP | 1 746 530 A1 | 1/2007 |
| EP | 2 233 103 A2 | 9/2010 |
| EP | 2 618 425 A1 | 7/2013 |

OTHER PUBLICATIONS

International Search Report for PCT/EP2014/069460 dated Dec. 11, 2014.

German Office Action for DE 10 2013 110 055.4 dated Jul. 31, 2014.

* cited by examiner

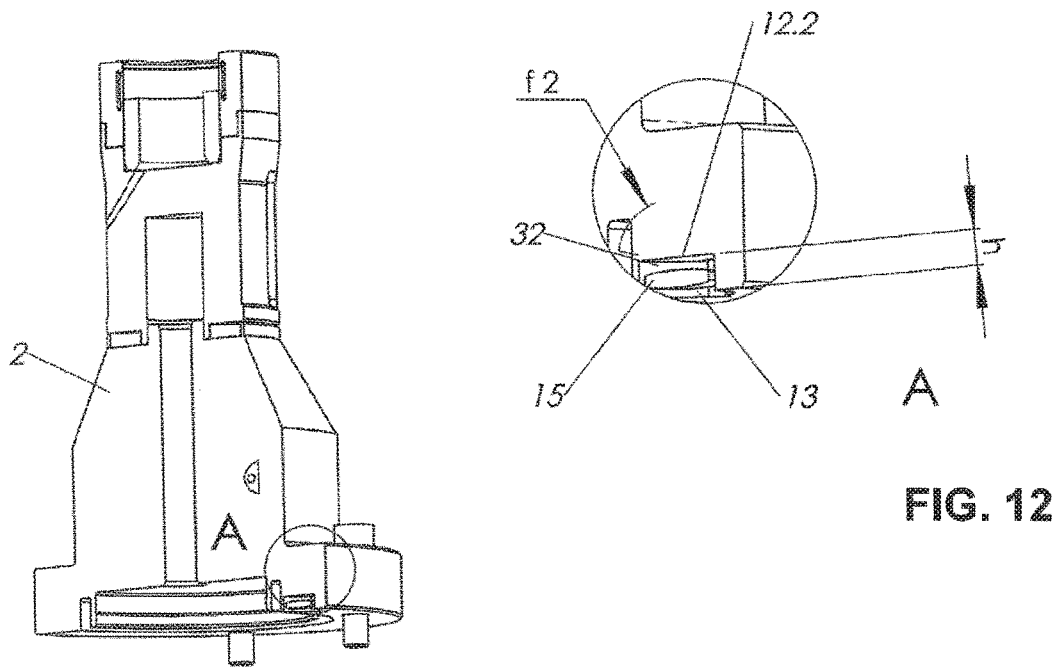
FIG. 11
FIG. 12
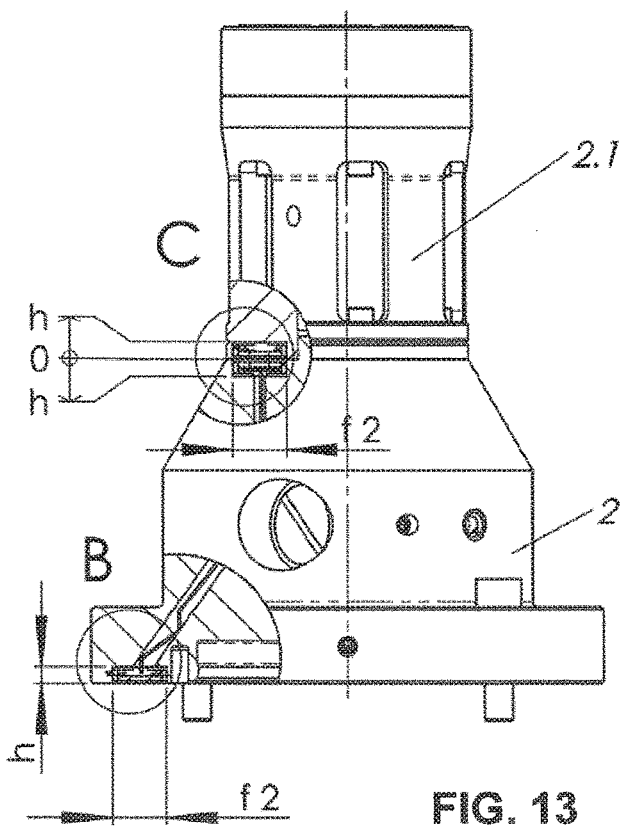
FIG. 13

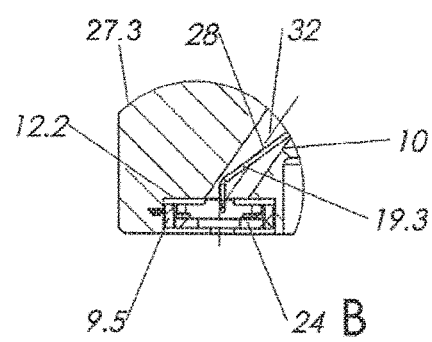
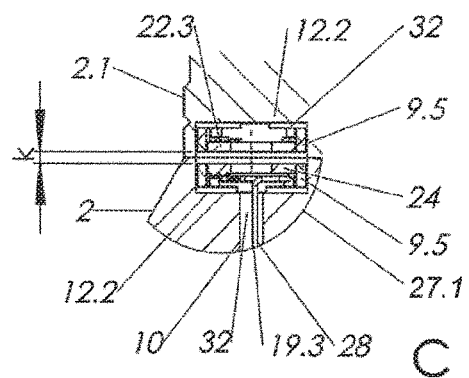
FIG. 14    FIG. 15
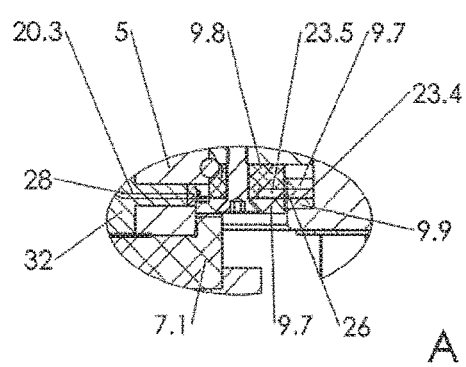
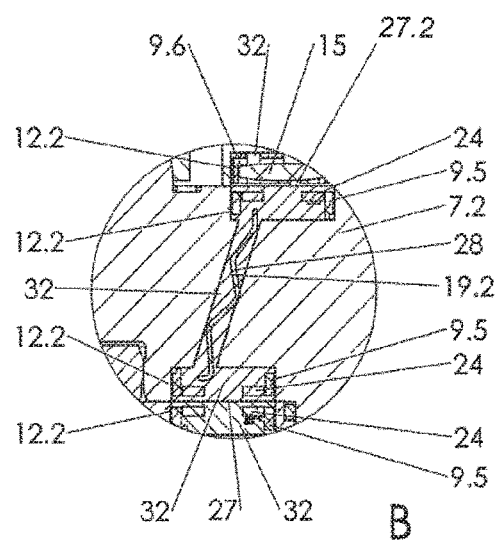
FIG. 17    FIG. 18

RFID IDENTIFICATION OF METAL INTERCHANGEABLE PARTS FOR MACHINE TOOLS

CROSS REFERENCE TO RELATED APPLICATIONS

This application is a National Stage of International Application No. PCT/EP2014/069460 filed Sep. 11, 2014, claiming priority based on German Patent Application No. 10 2013 110 055.4 filed Sep. 12, 2013, the contents of all of which are incorporated herein by reference in their entirety.

TECHNICAL BACKGROUND

The present invention relates to a machine tool, in particular a gear grinding machine, according to the preamble of claim 1. The invention also relates to an interchangeable component of such a machine tool.

PRIOR ART

Machine tools are often operated with a wide variety of interchangeable components made of metal. Such interchangeable parts may be, for example: dressing tools, clamping fixtures for workpieces, fixtures for tools such as grinding wheels, cooling medium nozzles, gripper jaws on handling devices etc. Depending on the application, the machine tool is equipped with different interchangeable parts. The interchangeable parts which are not required are kept in a warehouse. In order to be able to find and identify the interchangeable parts at any time, it is necessary to identify the interchangeable parts in such a way that they are not confused.

A known technology for identifying interchangeable parts is RFID (Radio-Frequency Identification) technology. In the last few years, RFID technology has developed quickly and is now present in many technical fields comprehensively from fabrication right through to stockkeeping. An RFID system can be integrated into most control systems, is suitable for all conventional bus systems and stores data directly at the interchangeable part. An RFID system comprises an RFID transponder (also referred to as a tag) and an RFID write/read device (also referred to as a reader). The tag and reader are coupled via high-frequency radio waves. In this context, the transponder is often supplied with energy from the high-frequency alternating field which is generated by the reader. RFID components are available in many designs.

With the abovementioned comprehensive use of the RFID technology from fabrication right through to stockkeeping, the manufacturer of the machine is only one element in a global chain of suppliers. The use of this technology in practice therefore requires compliance with global standards. For RFID technology there is, inter alia, the standard ISO 15693. This standard defines a transmission frequency of 13.56 MHz. The low-frequency RFID technology which was widespread earlier and which has frequencies below 500 kHz (longwave range, "LF technology") cannot be used in global applications owing to different national regulations regarding radio licenses.

In the prior art, different proposals have been made to provide metallic interchangeable parts of machine tools with an electronic data carrier which can be read in a contactless fashion. An example can be found in DE 10 2006 008 395 A1. In said document, a rotating tool is provided with an electronic data carrier. In order to permit the data carrier to be read and to be written to even during the rotation of the tool, it is proposed to construct the electronic data carrier in an annular shape, to arrange it concentrically with respect to the rotational axis, and to transmit signals over an annular air gap. The air gap is open and is not specifically protected against environmental influences.

A further tool identification by means of RFID technology is proposed in EP 1 339 014 A1. A plurality of RFID tags are mounted on a rotating mounting body. The signals are also transmitted over an open air gap.

In order to identify processing tools in a tool holder, EP 1 746 530 A1 proposes providing an antenna arrangement of an RFID transponder on the outer circumference of the tool holder. The transmission of signals also occurs over an open air gap.

Such arrangements usually function reasonably well during real operation as long as the transmission of data takes place in a relatively low-frequency range of at most several hundred kHz. However, if the transmission is to take place at significantly higher frequencies in the range of several MHz, for example at 13.56 MHz, as in ISO 15693, it has become apparent that the transmission of data is unreliable in practice, or completely fails. This is the case, in particular, if operating media such as cooling fluids or grinding sludge are used, as is generally the case with machine tools.

The article "RFID misst Werkzeugverschleiss auch durch Metall" ("RFID measures tool wear even through metal") in www.maschinenmarkt.vogel.de of Feb. 2, 2009 discloses an RFID transponder which is located in a metallic tool adapter. The tool adapter is inserted into a rotatable spindle. An antenna coil, which is connected to the RFID transponder via a cable, is arranged on the outer circumference of the tool adapter. A further antenna coil is located in the rotatable spindle. A further pair of antenna coils are located between the rotatable spindle and a fixed part of a measuring device. The precise configuration of the radio links between the adapter and the spindle, on the one hand, and between the spindle and the fixed part, on the other, is not disclosed. In particular, it is not disclosed how the antenna coils are constructed and arranged in the spindle and what dimensions these coils have. The frequency range in which the RFID transponder is operated is not disclosed either.

SUMMARY OF THE INVENTION

It is an object of the invention to provide a machine tool in which signals can be transmitted to an interchangeable part even at high frequencies, specifically even when operating media such as cooling fluids, grinding sludge or grinding chips are present.

A machine tool is thus proposed which comprises:
- a first component which has a first antenna coil for wireless signal transmission, and
- at least one second component which is removably and/or movably arranged on the first component and has a second antenna coil for wireless signal transmission.

In order to ensure reliable wireless signal transmission between the first and second antenna coils, the first component and the second component together delimit a cavity which is surrounded essentially completely by an electrically conductive material, in particular by metal, and the first antenna coil and the second antenna coil are arranged together in this cavity.

In such an arrangement, the two antenna coils are coupled inductively and form a radio link which is protected against interfering external influences by a Faraday cage. If the two components are fabricated from metal, as is customary with machine tools, the radio link is therefore a "metal-protected radio link". The cavity can when necessary be very small (for example can have an inner diameter of 20 mm or less), since reliable signal transmission can also be achieved with small antennas (for example with an outer diameter of 15 mm). As a result, the proposed solution can be implemented even under restricted spatial conditions such as are often present in machine tools. The proposed arrangement of antenna coils is suitable to be used comprehensively from fabrication on the machine to storage in a warehouse.

The cavity is considered to be "essentially completely surrounded by electrically conductive material" if possibly present interruptions or openings in the boundary surface of the cavity are small compared to the surface area of the entire boundary surface and in particular take up an area of less than 10%, preferably less than 5% of this boundary surface. In addition, such openings should be small compared to the wavelength of the transmitted electromagnetic radiation, but this is the case anyway with the wavelengths which are customary in practice, these wavelengths being in the meter range. Such interruptions and openings can be formed, for example, by a gap between the first and second components or by access openings for electrical cables.

The first component can be, for example, a component which is rigidly arranged on the machine stand, for example a part of a housing for a rotatable spindle. In this case, the second component can be, for example, the spindle itself. However, the first component can be a component which is itself rotatable with respect to the machine stand, for example said spindle, and the second component is then a component which can be removably mounted on the spindle, such as a tool, a tool fixture or a workpiece fixture, an adapter etc.

The cavity is preferably configured and arranged in such a way that no operating fluids of the machine tool, such as cooling medium or grinding sludge, can penetrate into the cavity. Such operating fluids are often electrically conductive at high frequencies, with the result that the operating fluids can, under certain circumstances, damp high-frequency alternating electromagnetic fields to a great extent. Impurities carried along in the operating fluids, such as grinding chips, are also frequently electrically conductive and have a strong damping effect. In addition, electrostatic discharges, which have a disruptive effect on the transmission of signals, can occur as a result of friction.

In order to avoid the ingress of operating fluids, a seal can be provided between the first and second components. Alternatively or additionally, the cavity can be constructed in regions of the first and second components which during operation do not even come into contact with operating fluids and which can be sealed, in particular, with respect to regions which conduct operating fluids. It is alternatively or additionally also possible to fill or seal at least part of the cavity with a non-conductive material, for example a sealing compound. If the cavity is not protected against the penetration of electrically conductive operating fluids in some other way, it is preferred that at least 95%, preferably at least 99%, of the entire volume of the cavity is protected against the penetration of operating fluids by means of non-conductive materials.

The two antenna coils are preferably arranged coaxially in order to optimize the inductive coupling and therefore the transmission of signals. To be more precise, the first antenna coil preferably defines a first coil axis, the second antenna coil defines a second coil axis, and the first coil axis and the second coil axis essentially coincide. In this context, the antenna coils can have, in particular, an essentially circular outline.

The cavity which is bounded by the two components is preferably cylindrical in this case, wherein the cylinder axis coincides with the coil axes. The cavity can have, in particular, the form of a full cylinder. In this case, preferably no electrically conductive material is located in the region of the cylinder axis. In other embodiments, the cavity is in the form of an annular cylinder, wherein correspondingly conductive material is then located in the region of the cylinder axis.

If the dimensions of the antenna coils in such an arrangement are comparable with the dimensions of the cavity, the enclosure of the antenna coils by conductive material leads not only to shielding of interfering influences but also to concentration of the magnetic and electrical field lines in the cavity, with the result that the transmission of signals takes place in a more directional fashion than in an open air gap. For this purpose it is preferred if the maximum inner diameter of the cavity is not greater than approximately 1.5 times the larger of the two coil diameters, preferably not larger than 1.2 times this diameter. In more precise terms, the first antenna coil has a first diameter, the second coil has a second diameter, and the cavity preferably has a maximum inner diameter which is not larger than 1.5 times (preferably not larger than 1.2 times) the larger value of the first diameter and the second diameter. The difference between the maximum inner diameter of the cavity and the larger of the two coil diameters is preferably not larger than 10 mm, more preferably not larger than 5 mm.

In order to allow magnetic field lines to form sufficiently around the windings of the antenna coils, the radial and axial distance of the antenna coils from the surrounding electrically conductive material should not be too small. The first antenna coil and the second antenna coil are preferably at a distance which everywhere is at least 1 mm, preferably at least 1.5 mm, from the surrounding electrically conductive material.

The transmission of signals between the first antenna coil and the second antenna coil can essentially take place in the axial direction or essentially in the radial direction; however, it is also possible for the transmission to occur diagonally with respect to the common coil axis. In the case of axial signal transmission it is preferred if the first antenna coil and the second antenna coil are arranged axially opposite one another. For this purpose, the two antenna coils can essentially have the same outer and inner diameters. In the case of radial signal transmission it is preferred if the first antenna coil surrounds the second antenna coil radially, or if the second antenna coil surrounds the first antenna coil radially, wherein the two antenna coils are then preferably arranged in a common plane.

The first and second components can be rotatable relative to one another about a rotational axis. This is the case, for example, when the first component is a component which is fixedly mounted on the machine stand and the second component is a spindle. In this case, it is preferred if the first antenna coil and the second antenna coil are arranged in such a way that wireless signal transmission is possible between the first antenna coil and the second antenna coil both in the stationary state and during rotation of the second component with respect to the first component. As a result it becomes possible for a transmission/reception module, for example an RFID transponder which is connected to one of the antenna coils, to be read even during operation at a high rotational speed. In order to achieve this it is preferred if the first antenna coil defines a first coil axis, the second antenna coil defines a second coil axis and the first coil axis and the second coil axis correspond to the rotational axis. In this case, the cavity is preferably configured in a rotationally symmetrical and coaxial fashion with respect to the rotational axis.

However, situations are also conceivable in which the first and second components are rotatable together with respect to a machine bed about a rotational axis, for example if the first component is a spindle and the second component is a tool held therein or a workpiece fixture held therein. In this case, it is preferred if the cavity is arranged either coaxially with respect to the rotational axis, as described above, or spaced apart from the rotational axis in such a way that the cavity does not overlap with the rotational axis. In the latter case, a second, identical cavity can be provided offset by 180° about the rotational axis in order to facilitate balancing.

The cavity is preferably bounded at least in one of the two components by a cylindrical recess, wherein the other component then closes off this recess to form the cavity. In other words it is preferred that
- at least the first component has a region made of electrically conductive material, preferably a metallic region, with a cylindrical recess,
- the cylindrical recess defines a cylinder axis and has an opening toward a surface of the first component,
- the first antenna coil is arranged concentrically with respect to the cylinder axis in a region of the cylindrical recess which is near to the opening, and
- the cylindrical recess is closed by the second component to form the cavity.

The present invention also relates, in a further aspect, to a correspondingly constructed component, that is to say to a component for use in a machine tool having the following properties:
- The component comprises an antenna coil for wireless signal transmission, wherein the antenna coil defines a coil axis.
- The component has a region made of electrically conductive material, preferably metal, with a cylindrical recess, wherein the cylindrical recess defines a cylinder axis and is open toward a surface of the component.
- The antenna coil in the cylindrical recess is arranged concentrically with respect to the cylinder axis, preferably in a region of the recess which is near to the opening.

The cylindrical recess preferably has only a small depth, in particular, a depth of 4-10 mm, preferably of approximately 6 mm, in the axial direction. A relatively large depth is, on the one hand, not required if flat antenna coils are used, and is, on the other hand, also disadvantageous because an excessively large depth does not contribute to the desired concentration of the electrical and magnetic field lines. An excessively small depth is in turn disadvantageous because a distance of at least 1 mm, better at least 1.5 mm, is to remain between the antenna coil and the surrounding conductive material, so that the field lines can form around the windings of the antenna coil.

The cylindrical recess is preferably open toward an end face of the first component. In order to ensure efficient signal transmission, in this case the first antenna coil should be arranged as close as possible to the opening of the recess. In particular the first antenna coil should be at a clearance of at maximum 2 mm, preferably at maximum 1.5 mm from the end-side opening of the cylindrical recess.

The cylindrical recess can form a blind hole in an end face of the first component, which hole is closed off at its end remote from the opening (possibly apart from a through-bore for cables etc.). However, the end of the cylindrical recess which is remote from the opening can also be adjoined in the axial direction by a central bore with a relatively small diameter. In this case, the cylindrical recess can also be conceived of as an annular milled opening at the end-side end of the bore. In yet other embodiments it is also conceivable that the cylindrical recess is itself in the shape of an annular groove in an end face of the first component. In yet other embodiments, the cylindrical recess can form an annular groove in a lateral wall of a cylindrical bore or an annular groove in an outer cylindrical lateral wall which is adjoined by conductive material axially on both sides.

A region of the second component which is made of electrically conductive material, in particular a metallic region of this component, can extend into the cylindrical recess, in order to close the cylindrical recess to form an annular-cylindrical cavity. If the cylindrical recess is adjoined in the axial direction (on one side or on both sides) by a bore with a relatively small diameter, it is preferred that the cylindrical region of the second component extends not only through the cylindrical recess but additionally also into this bore. Such an embodiment is advantageous, in particular, when the first component is fitted axially onto the second component in order to connect the two components to one another.

The cylindrical recess can be potted with an electrically insulating sealing compound, in order to secure the antenna coil in the recess. In this way, undesired materials, such as, for example, operating fluids, can also be prevented from entering the recess.

In one possible embodiment, two cylindrical recesses are located axially or radially opposite one another. The first component then therefore has a region made of electrically conductive material, in particular made of metal, with a first cylindrical recess which is open toward the second component. The second component has a region made of electrically conductive material, in particular made of metal, with a second cylindrical recess which is open toward the first component. The first cylindrical recess and the second cylindrical recess then define a common cylinder axis and are located axially or radially opposite one another in such a way that together they bound a cylindrical cavity. If the recesses are located axially opposite one another, the first antenna coil and the second antenna coil are arranged concentrically with respect to the common cylinder axis in the cavity and are preferably located axially opposite one another. If the recesses are located radially opposite one another, the first antenna coil and the second antenna coil are also arranged concentrically with respect to the common cylinder axis in the cavity and one of the antenna coils preferably surrounds the other antenna coil radially.

The first and/or second antenna coil can be arranged in the form of one or more printed windings on an electrically insulating, flat circuit board. As a result it is possible to manufacture the antenna coils very easily in a reproducible fashion and to connect them to further elements. In this way, one or more further electrical or electronic elements, in particular one or more elements such as capacitors and/or resistors for matching impedance, a socket for connecting a coaxial cable and/or an RFID transponder, can be mounted on the circuit board. All further electrical or electronic elements are preferably arranged on a side of the circuit board facing away from the windings. In this way, the windings can be arranged on the respective component near to the opening without disruptive elements. In order to ensure sufficient strength even at high rotational speeds, the circuit board is preferably glass-fiber-reinforced. The circuit board is preferably configured in an annular shape, with a central opening.

An electronic transmission and/or reception module can be electrically connected to the first or second antenna coil. This transmission and/or reception module can have a transmission and/or reception frequency of more than 5 MHz. The transmission and/or reception module can be, in particular, an RFID component, in particular an RFID transponder or an RFID read/write unit (also referred to as an RFID reader or RFID transceiver). The transmission and/or reception frequency can be, in particular, 13.56 MHz. If the RFID component is an RFID transponder and the antenna coil is embodied in the form of printed windings on a circuit board, the transponder is preferably arranged on this circuit board. If it is an RFID read/write unit, this is, in contrast, preferably arranged spatially remotely from the antenna coil and connected thereto via a cable, preferably a coaxial cable.

The electronic transmission and/or reception module can be connected to a memory module or have an integrated memory module on which component-relevant data, for example an identification number, component data such as dimensions, material data, purpose of use etc. and/or data relating to the use of the component such as, for example, operating time data etc., are stored. The memory module can be provided for not only reading but also writing data during operation (such as is possible, for example, with EEPROM or FRAM memories). However, it is also conceivable to provide the transmission and/or reception module for other purposes than for purely reading out stored data, for example for transmitting sensor data. For this purpose, the machine tool or the respective component can comprise at least one sensor, for example a linear acceleration sensor or a gyro sensor (angular acceleration sensor), a temperature sensor, a pressure sensor, a proximity sensor etc., which is arranged on the first or second component and which is electrically connected to the transmission and/or reception module, arranged on the same component, in order to transmit sensor data.

However, a transmission and/or reception module can also be arranged only on a further, third component, wherein the second component then serves only to pass on signals between the first and third components without itself necessarily comprising transmission and/or reception modules. In particular it is conceivable that an interchangeable third component is connected to the second component;
that the second component comprises a third antenna coil which is electrically connected to the second antenna coil;
that the third component comprises a fourth antenna coil;
that the second component and the third component together define a further cavity which is surrounded essentially completely by an electrically conductive material, in particular a metal, and
that the third antenna coil and the fourth antenna coil are arranged together in the further cavity in order to permit wireless signal transmission between the third antenna coil and the fourth antenna coil.

In this case, the machine tool can comprise, for example, an RFID read/write unit which is electrically connected to the first antenna coil, and the third component can comprise an RFID transponder which is electrically connected to the fourth antenna coil. When the RFID transponder is read, electrical signals are correspondingly conducted from the RFID read/write unit in a wire-bound fashion to the first antenna coil. Said signals are transmitted in a wireless fashion to the second antenna coil. From there, the signals pass in a wire-bound fashion to the third antenna coil from where they are transmitted in a wireless fashion to the fourth antenna coil. Finally, the signals pass from there to the RFID transponder. The system can be extended with further components, each having two electrically connected antenna coils, in order to transmit signals between even more components.

The second and the third antenna coils are preferably connected by means of at least one cable, preferably a coaxial cable, which runs completely in the interior of the second component. In this way, damage to the cable during operation is avoided. The cable can run, in particular, through a cable guide bore which is filled with a sealing compound. Often very hard sealing resins, such as are customary in the construction of rotors or insulators, are used as sealing compounds. In order to achieve coefficients of thermal expansion which are close to those of the surrounding metal, very high mineral fillings are frequently provided in the sealing compound which cause considerable chemical volume shrinkage during curing. In order to avoid resulting excessive tensile forces acting on the cable, the cable can be loosely surrounded by a hose (for example a commercially available shrink-fit hose) before the sealing compound is filled in, with the result that when the sealing compound cures the cable can slide in the hose and as a result is strain-relieved.

As already mentioned, it is conceivable for the second component to be configured to be arranged on the machine tool so as to be rotatable about a rotational axis. The cable guide bore can then run at least in certain areas at a distance from the rotational axis in a decentralized fashion. In order to minimize unbalance, the component can then have a compensation bore which is configured essentially identically to the cable guide bore but which runs offset with respect to the cable guide bore by 180° in relation to the rotational axis. Said cable guide bore is then likewise filled with the sealing compound.

BRIEF DESCRIPTION OF THE DRAWINGS

Preferred embodiments of the invention, which serve merely for explanation and are not to be interpreted in a limiting way, are described below with reference to the drawings, in which:

FIG. 11 shows a first variant of a clamping means for gearwheels, with an RFID tag;
FIG. 12 shows an enlarged view of the detail A in FIG. 11;
FIG. 13 shows a second variant of a clamping means for gearwheels, with an RFID tag;
FIG. 14 shows an enlarged view of the detail B in FIG. 13;

FIG. 15 shows an enlarged view of the detail C in FIG. 13;

FIG. 17 shows an enlarged view of the detail A in FIG. 16;

FIG. 18 shows an enlarged view of the detail B in FIG. 16;

DESCRIPTION OF PREFERRED EMBODIMENTS

FIGS. 1 to 10 illustrate, in various views, a dressing device as a first example of a machine tool according to the invention with a metal-protected radio link.

Figure 1:
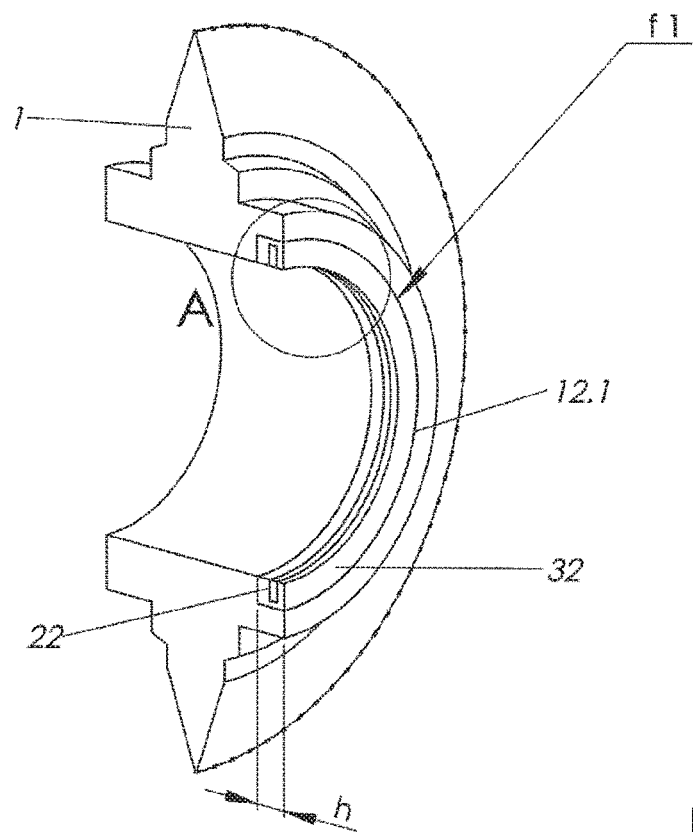
FIG. 1 shows a dressing tool with RFID tag.

The dressing device comprises an interchangeable, rotatable component in the form of a dressing disk 1 which is illustrated alone in FIG. 1. The dressing disk 1 has a central bore. A cylindrical recess 12.1 with a diameter f1 and an axial depth h=6 mm is formed at one end of the bore. An annular first circuit board 22 is arranged in the cylindrical recess 12.1. The remaining space in the cylindrical recess 12.1 is filled with a sealing compound 32. This sealing compound is electrically non-conductive, very hard and as a result suitable for use in a component which rotates at high speed.

Figure 8:
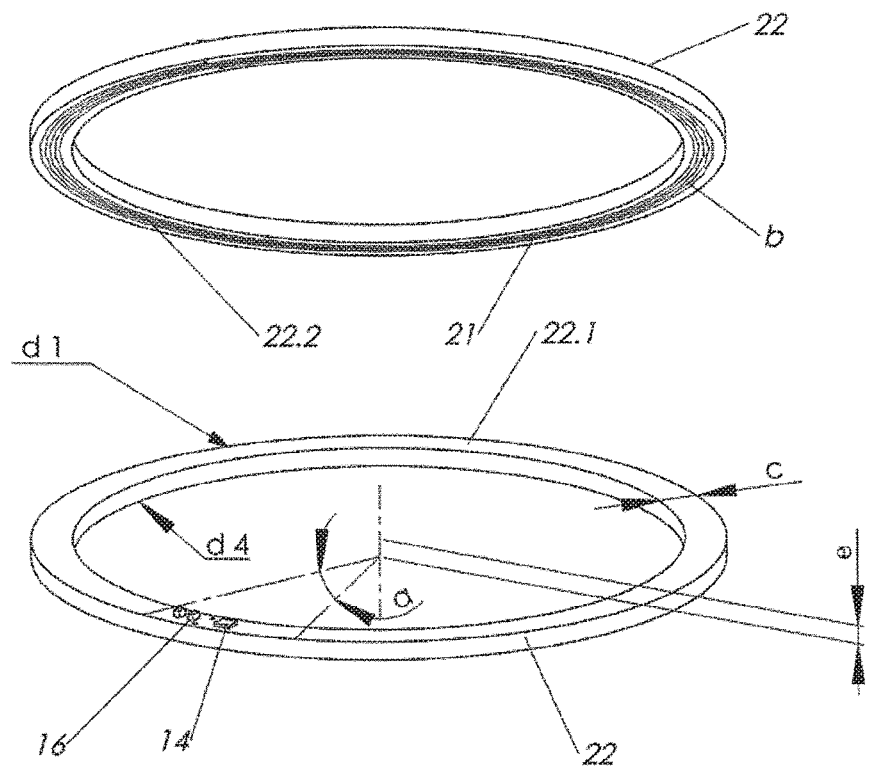
FIG. 8 shows a first embodiment of an annular circuit board.

The first circuit board 22 is illustrated separately in FIG. 8. An antenna coil 21 in the form of a plurality of printed windings is formed on the underside 22.2 of the circuit board. The windings occupy an annular region with a width b. A plurality of electronic components, including an RFID tag 14 which forms a transmission/reception device and has an integrated FRAM memory as well as a plurality of elements such as capacitors 16 for matching impedance are mounted on the upper side 22.1 of the circuit board 22. These electronic elements are arranged in a limited angular region a in the circumferential direction, which angular region a is less than approximately 30° in the present example. The circuit board 22 has a thickness e=1.6 mm, an outer diameter d1 which is selectable as desired according to the application, an annular width c=5 mm and an inner diameter d4=d1−2c. Said circuit board 22 is manufactured from a glass-fiber-reinforced plastic.

Figure 2:
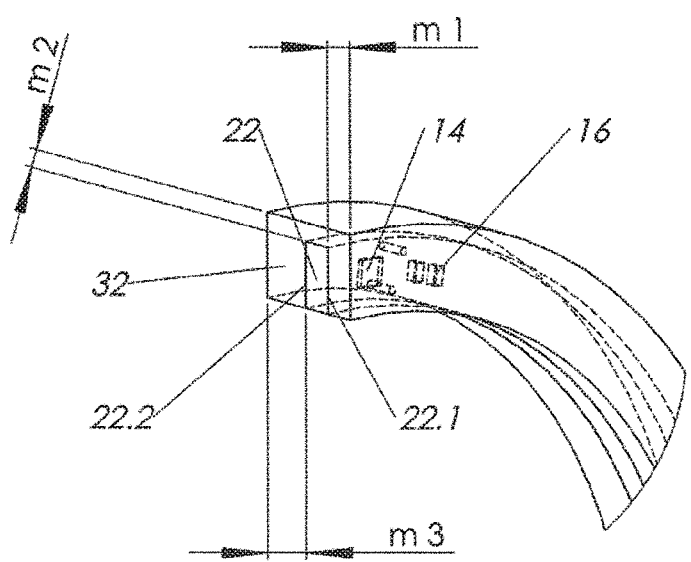
FIG. 2 shows an enlarged view of the detail A in FIG. 1.

As illustrated in FIG. 2, the upper side 22.1 of the circuit board 22 has, in the axial direction, a clearance m1=1.5 mm from the end-side surface of the dressing disk. The underside 22.2 of the circuit board has, on the other axial side, a distance m3=2.9 mm from the metallic material of the dressing disk 1. The outer edge of the circuit board is arranged radially at a distance m2=1.5 mm from the metallic material of the dressing disk 1.

Figure 3:
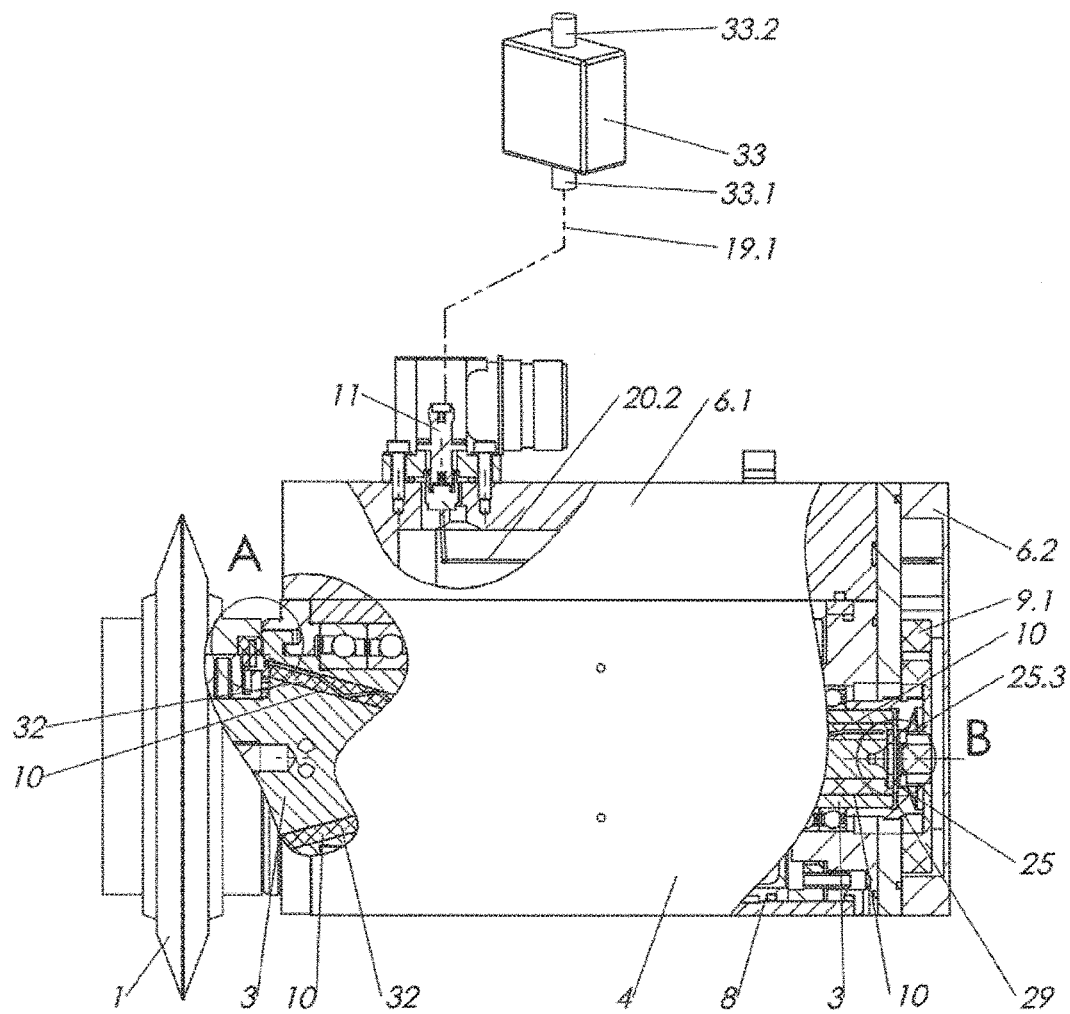
FIG. 3 shows a dressing device with a dressing tool according to FIG. 1 and with an RFID reader.

The dressing disk 1 is clamped onto the distal end of a rotatable dressing spindle 3. This is illustrated in FIG. 3. In this context, the dressing disk 1 can assume any desired angular position with respect to the dressing spindle 3.

Figure 4:
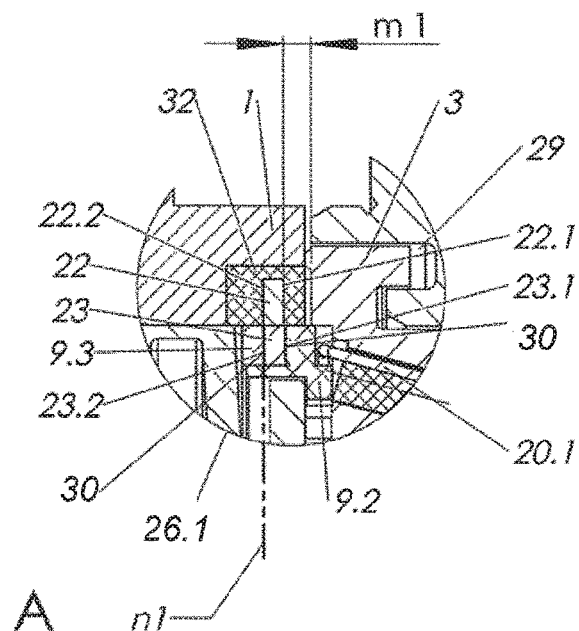
FIG. 4 shows an enlarged view of the detail A in FIG. 3.
Figure 5:
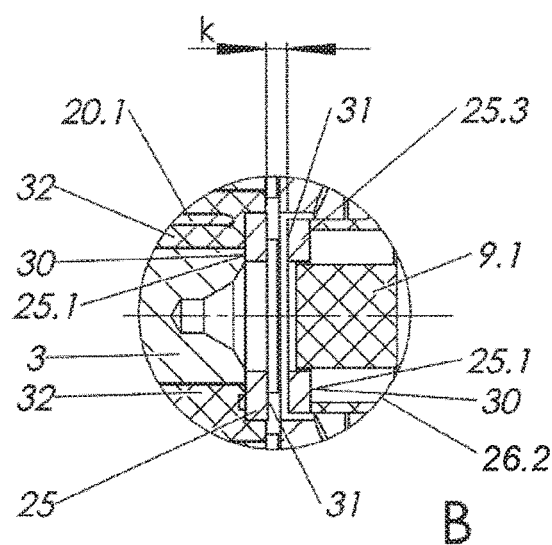
FIG. 5 shows an enlarged view of the detail B in FIG. 3.

As illustrated in FIG. 4, an annular second circuit board 23 is arranged on the outer circumference of the distal end of the dressing spindle 3 and is held there by means of non-conductive retaining elements 9.2 and 9.3. The second circuit board 23 is bonded on both sides to the two retaining elements 9.2 and 9.3 by means of a non-conductive adhesive 30. As a result, all the electrically conductive regions of the second circuit board 23 are protected against creepage currents and differences in potential by means of non-conductive materials.

Figure 9:
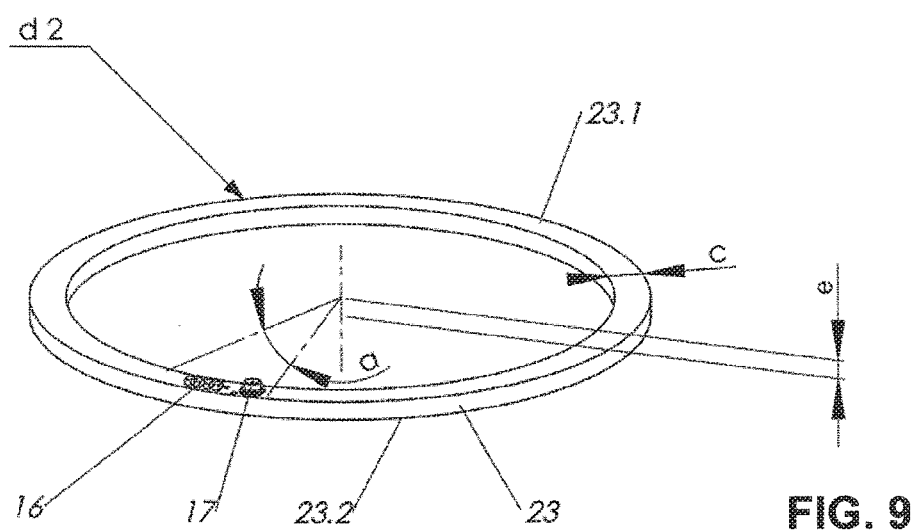
FIG. 9 shows a second embodiment of an annular circuit board.

The second circuit board 23 alone is illustrated in FIG. 9. It comprises on its underside 23.2 an antenna coil (not visible in FIG. 9) which is formed by a plurality of printed windings. The antenna coil is embodied in precisely the same way as the antenna coil 21 in FIG. 8. On its upper side 23.1, the circuit board 23 comprises a plurality of capacitors 16 for impedance matching and a miniaturized socket for connecting to the plug of a coaxial cable. These electronic components take up a limited angular region a<30°. The annular width c and the thickness e of the second circuit board 23 are selected in the same way as for the first circuit board 22.

The first circuit board 22 is arranged concentrically with respect to the second circuit board 23 and with respect to the rotational axis of the dressing spindle 3 and surrounds the second circuit board 23 radially. In this context, the two antenna coils which are formed on the first and second circuit boards 22 and 23 are located in a common plane n1. The outer diameter d2 of the second circuit board 23 is only slightly smaller than the inner diameter d4 of the first circuit board, with the result that the two circuit boards form a very small gap of less than 1 mm between them. The concentric arrangement of the circuit boards and of the antenna coils makes it possible to transmit signals between the antenna coils in any desired orientation of the dressing disk 1 with respect to the dressing spindle 3.

The dressing disk 1 and the dressing spindle 3 together bound an annular cavity in which the two circuit boards 22 and 23 are arranged. The cavity is enclosed on all sides by the electrically conductive metal of the dressing disk 1 and the dressing spindle 3. In particular, the dressing spindle 3 completely closes off the cylindrical recess 12.1. A radio link 26.1 for transmitting signals is therefore formed between the antenna coils of the circuit boards 22 and 23, said radio link 26.1 being protected by the surrounding metal of the dressing disk 1 and the dressing spindle 3 against external disruptive influences. In addition, no operating fluids such as cooling medium or grinding sludge can enter the region of this metal-protected radio link 26.1, since the dressing disk 1 rests in a seal-forming fashion on the dressing spindle 3.

Interferences in the transmission of signals could be caused not only by operating fluids but also by condensation of moisture in the region of the radio link 26.1. In order to ensure to an even better degree that operating fluids are prevented from penetrating the cavity or that moisture is prevented from condensating in the cavity, a region 29 between the dressing spindle 3 and the housing of the dressing device can additionally be provided with sealing air at a slight excess pressure.

A second metal-protected radio link 26.2 between two further antenna coils is formed at the proximal end of the dressing spindle 3. This radio link is illustrated in more detail in FIG. 5. For this purpose, a cylindrical recess, into which an annular third circuit board 25 is inserted, is formed at the proximal end of the dressing spindle 3, on the end side. The third circuit board 25 terminates, with its underside, flush with the proximal end side of the dressing spindle 3. The third circuit board 25 is held by its upper side 25.1 in the recess by means of an electrically non-conductive adhesive 30. The third circuit board is protected by an electrically non-conductive protective coating on the underside.

Figure 10:
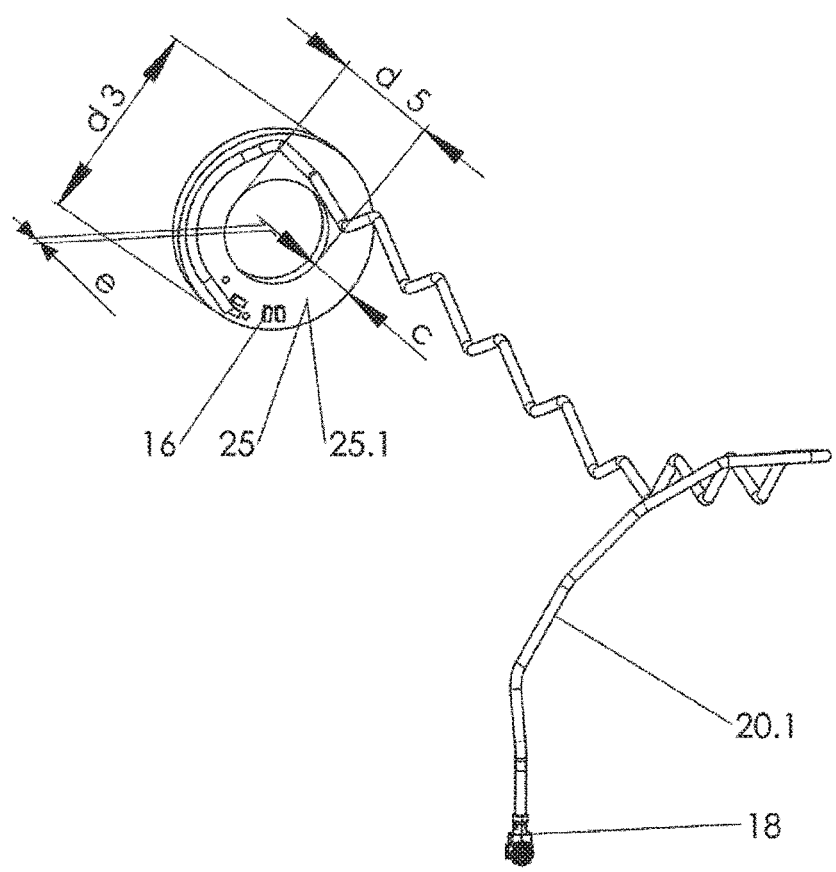
FIG. 10 shows a third embodiment of an annular circuit board.

The third circuit board 25 is illustrated alone in FIG. 10. It comprises on its underside an antenna coil in the form of printed windings (not shown in FIG. 10). Electronic elements such as capacitors 16 for impedance matching are mounted on the upper side 25.1 of said circuit board 25. In addition, a coaxial cable 20.1 is soldered directly onto the upper side 25.1. Said coaxial cable 20.1 comprises a miniaturized plug 18 at its other end. The third circuit board 25 has an outer diameter d3=15 mm, an inner diameter d5=5 mm, an annular width c=5 mm and a thickness e=1.6 mm.

Figure 6:
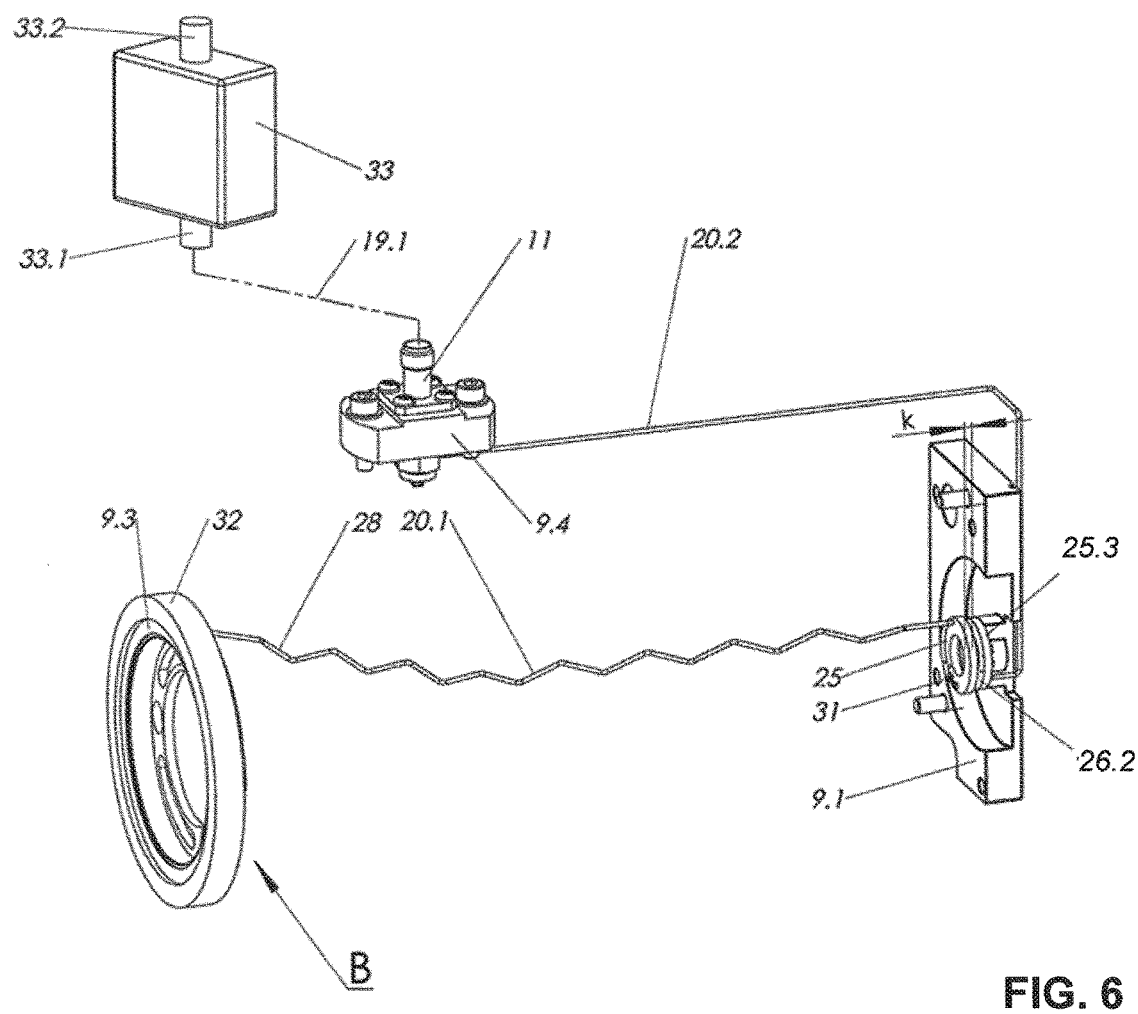
FIG. 6 shows an illustration of the transmission paths in the dressing device in FIG. 3.
Figure 7:
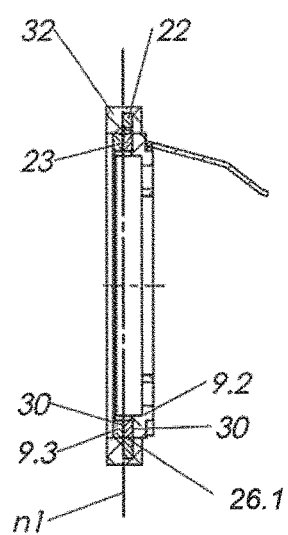
FIG. 7 shows a central longitudinal section through the region B in FIG. 6.

As can be seen in particular in FIG. 6, the coaxial cable 20.1 connects the second circuit board 23 to the third circuit board 25. For this purpose, the plug 18 is plugged into the socket 17 of the second circuit board 23. The cable 20.1 runs through a decentrally arranged bore 10 in the interior of the dressing spindle 3. This bore is potted with a sealing compound 32. In order to prevent excessive tensile forces acting on the cable 20.1 as a result of the shrinkage of the sealing compound during curing, the cable is loosely surrounded by a shrink-fit hose 28. As a result, during curing of the sealing compound the cable can slide in the shrink-fit hose. Furthermore, the fact that the cable is oriented tangentially with respect to the circumferential direction in the region in which said cable leaves the plug 18 contributes to effective strain relief.

A second identical bore 10 runs through the dressing spindle 3 offset from the first bore by 180° in the circumferential direction. This bore is also potted with the sealing compound 32. In this way, unbalance is avoided as far as possible.

A non-conductive retaining element 9.1 is connected to the housing 4 of the dressing device. An annular fourth circuit board 25.3 is attached to this retaining element. Said circuit board 25.3 is embodied essentially in the same way as the third circuit board and merely has a slightly smaller outer diameter than the circuit board 25. The upper side of the fourth circuit board 25.3 is connected to the retaining element 9.1 by means of a non-conductive adhesive 30. A protective coating is applied to the underside of the fourth circuit board 25.3. The antenna coils on the third circuit board 25 and the fourth circuit board 25.3 are each arranged coaxially with respect to the rotational axis and are located axially one opposite the other at a distance k=1 . . . 3 mm. The two circuit boards are oriented here in such a way that their antenna coils point toward one another, i.e. the undersides of the two circuit boards are located axially opposite one another.

A coaxial cable 20.2 runs from the fourth circuit board 25.3 to a cable retaining element 11 which is attached by an electrically non-conductive retaining element 9.4 to a housing part 6.1 of the dressing device. The cable retaining element 11 is connected to the input 33.1 of an RFID reader 33 via a further coaxial cable 19.1. Data relating to the further use can be read at the output 33.2 of the RFID reader 33 via a further cable (not illustrated).

As is apparent in FIG. 3, a metallic gear wheel at the proximal end of the dressing spindle 3 projects into the retaining element 9.1. The proximal end of the dressing device is closed off with a metallic end cap 6.2. The latter rests circumferentially on a metallic region of the housing 4 of the dressing device. The dressing spindle 3, the gear wheel at its proximal end, the housing 4 and the end cap 6.2 together bound a cavity in which the third circuit board 25 and the fourth circuit board 25.3 are arranged. This cavity is enclosed on all sides by the electrically conductive metal of the dressing spindle 3, of the gear wheel, of the housing 4 and of the end cap 6.2. As a result, the second radio link 26.2 between the antenna coils of the circuit boards 25 and 25.3 is also protected by metal. Sealing air at a slight excess pressure can also be fed into a region 29 at the proximal end of the dressing spindle, in order to prevent the penetration of operating fluids into the cavity and the formation of condensation moisture.

During operation, the RFID reader 33 generates a high-frequency reader signal (for example at a carrier frequency of 13.56 MHz) which passes through the cable 19.1, the cable retaining element 11 and the cable 20.2 to the antenna coil of the fourth circuit board 25.3. Here, the signal is transmitted in a wireless fashion to the antenna coil on the third circuit board 25 via the second metal-protected radio link 26.2. This transmission is possible even if the dressing spindle 3 is rotating, since the transmission from the fixed region of the machine to the spindle takes place via antenna coils which are arranged coaxially with the rotational axis.

The signal passes from the third circuit board 25 via the cable 20.1 to the antenna coil on the second circuit board 23. The signal is then transmitted in a wireless fashion via the first metal-protected radio link 26.1 to the antenna coil 21 on the first circuit board 22. Here, the signal is received by the RFID tag 14. The RFID tag can then be read in the usual way, for example by load modulation, during which the RFID tag changes its impedance in a way which varies over time, and therefore also changes the impedance, which can be measured at the RFID reader 33, of the entire transmission path with the RFID tag connected thereto, or by the RFID tag 33 itself transmitting high-frequency signals in the opposite direction via the transmission link.

The dressing device comprises in a known fashion a servomotor 8 for driving the dressing spindle 3. Since the radio links 26.1 and 26.2 are metal-protected, they are also protected against electromagnetic interference, which can possibly originate from the servomotor 8.

FIGS. 11-15 illustrate two variants of a clamping means 2. FIGS. 16-21 illustrate, as a further example of a machine tool according to the invention, a workpiece spindle 5 with the first variant of the clamping means 2. In the same way, the workpiece spindle 5 can, however, also be equipped with the second variant of the clamping means.

Figure 19:
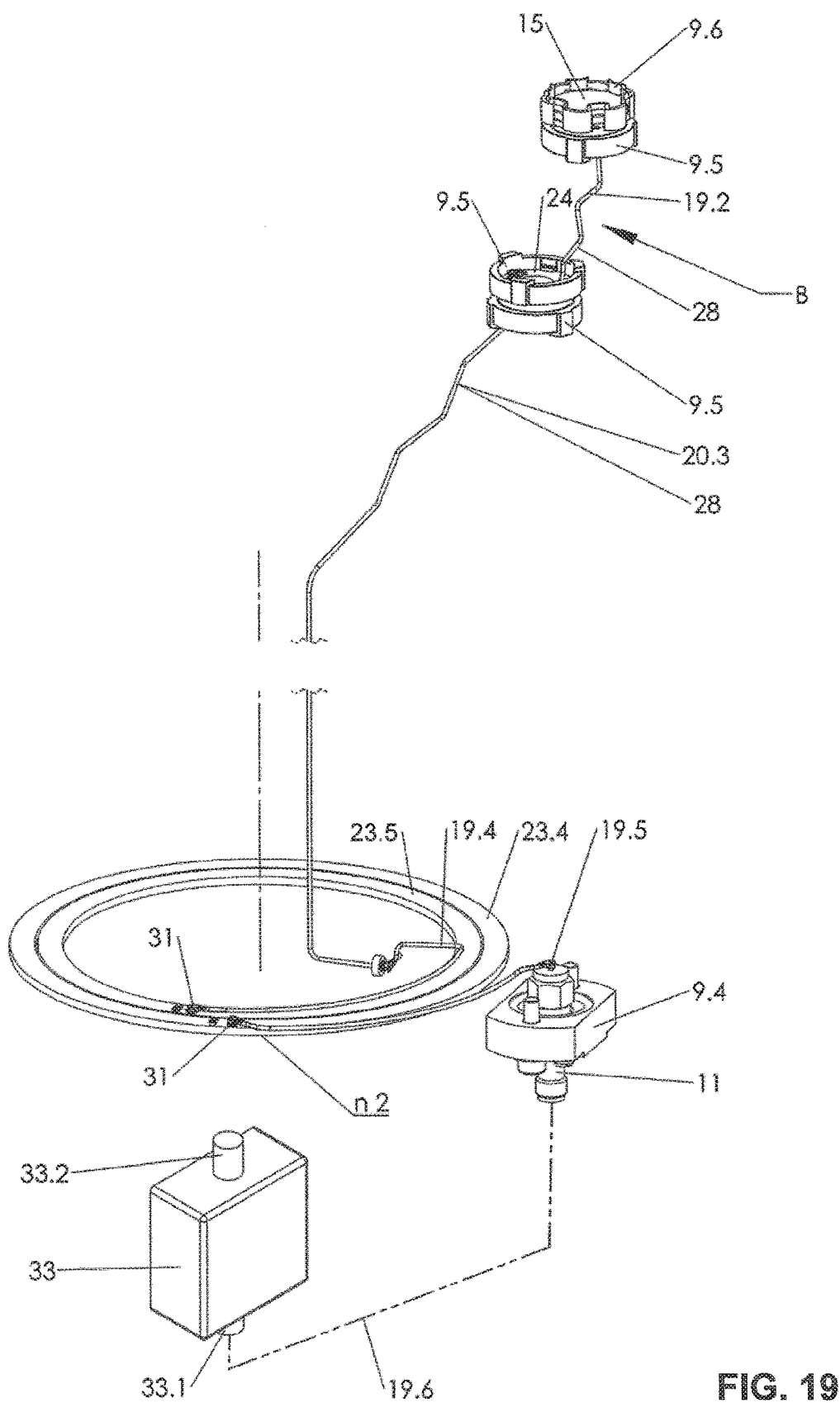
FIG. 19 shows an illustration of the transmission paths in the workpiece spindle in FIG. 16.
Figure 20:
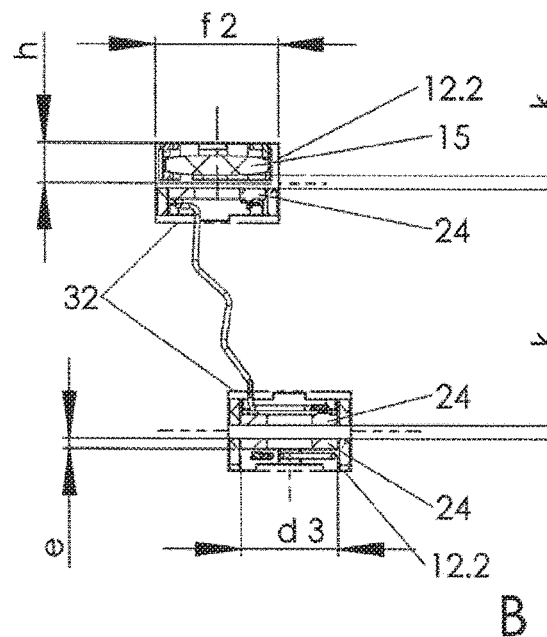
FIG. 20 shows an enlarged view of the detail B in FIG. 19.

In the first variant, which is illustrated in FIGS. 11 and 12, the clamping means has, on its proximal end side, a cylindrical recess 12.2 with a diameter of f2=19 mm and an axial depth h=6 mm. The recess 12.2 is arranged in a decentralized fashion, i.e. at a distance from the rotational axis. In the recess, a commercially available RFID tag 15 with an integrated antenna is arranged near to the open end face 13 and is secured there by means of a sealing compound 32. As illustrated in FIG. 19, the RFID tag 15 can be additionally held in a retaining element 9.6.

In the second variant, which is illustrated in FIGS. 13-15, the clamping means 2 has two parts: a base and a removable fitting 2.1 which is held to the base in a defined orientation. A cylindrical recess 12.2 with the same dimensions as in the first variant is formed in a decentralized fashion in the proximal end side of the fitting 2.1 (FIG. 15). A circuit board 22.3 with an RFID tag is located in this recess. The circuit board 22.3 is held in the recess 12.2 by means of an electrically non-conductive retaining element 9.5 and is secured by means of a sealing compound 32. Instead of the circuit board 22.3, a commercially available RFID tag with an integrated antenna could also be provided, as in the first variant. An identical cylindrical recess 12.2, in which a circuit board 24 which has the same dimensions is arranged and held by means of a retaining element 9.5, is provided axially opposite in the distal end side of the base.

Figure 21:
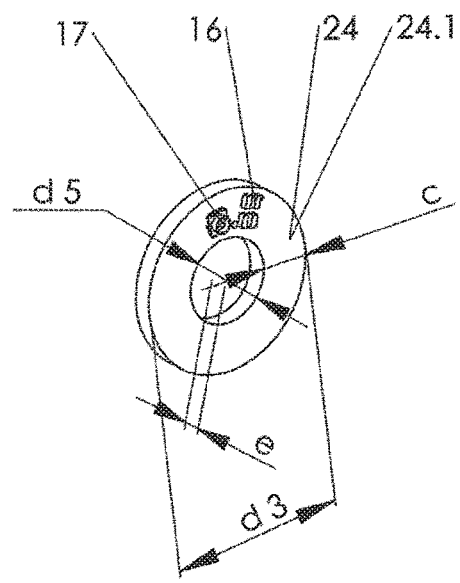
FIG. 21 shows a fourth embodiment of an annular circuit board.

The circuit board 24 is illustrated alone in FIG. 21. On its underside, an antenna coil, not illustrated, is formed, and on its upper side 24.1 there are elements such as capacitors 16 for impedance matching as well as a miniaturized coaxial socket 17.

The circuit board 22.3 in the fitting 2.1 and the circuit board 24 in the distal end side of the base are located axially opposite one another and form a radio link 27.1. The latter is located in a cavity which is defined by the two cylindrical recesses 12.2 and is surrounded entirely by metal. The radio link 27.1 is therefore again a metal-protected radio link. Since relative movement does not occur between the recesses 12.2 during operation, both recesses 12.2 can be potted completely. Therefore, condensation moisture cannot form within the radio link.

In the proximal end side of the base of the clamping means 2, a further cylindrical recess 12.2 is formed (FIG. 14). A further annular circuit board 24, which is embodied and held in identical fashion as the circuit board 24 in the recess in the distal end side of the base, is arranged there. A coaxial cable 19.3 runs through a bore 10 between these two circuit boards and is plugged in with miniaturized plugs in the coaxial sockets 17 of the two circuit boards 24. The bore 10 is potted with a sealing compound 32. The coaxial cable 19.3 is protected against tensile strains during the curing of the sealing compound by a shrink-fit hose 28 which loosely surrounds the cable.

Figure 16:
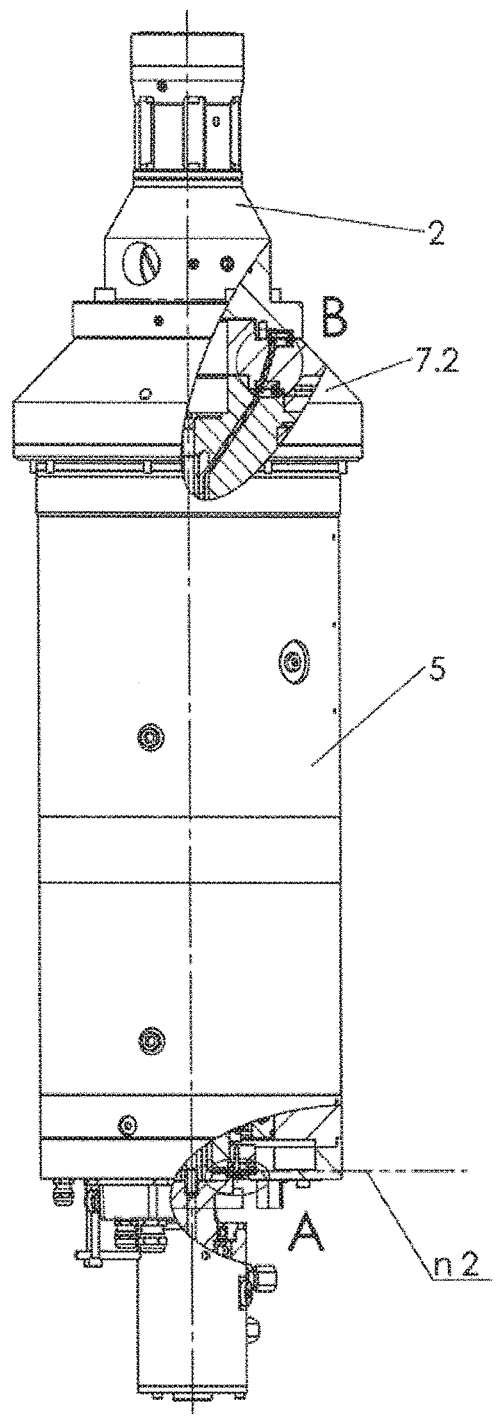
FIG. 16 shows a workpiece spindle with a clamping means according to the first variant according to FIG. 11.

In both variants, the clamping means 2 is attached to an intermediate element 7.2 on the workpiece spindle 5 (FIG. 16). The intermediate element 7.2 assumes a defined orientation relative to the workpiece spindle and can be removed from the workpiece spindle. In turn, in each case a cylindrical recess 12.2, in which in each case a circuit board 24 is arranged, is formed at the proximal and distal end sides of the intermediate element 7.2. Said circuit boards 24 are again connected by a coaxial cable 19.2. This is illustrated in FIG. 18. The recesses, the circuit boards, the cable etc. are embodied in the same way as the connection of the two recesses 12.2 in the base of the second variant of the clamping means 2, and reference is made to the above description of the clamping means for further details.

The clamping means 2 is fitted onto the intermediate element 7.2 in such a way that the cylindrical recesses 12.2 in the proximal end side of the clamping means 2 and in the distal end side of the intermediate element 7.2 are located axially opposite one another. Together these recesses form a cavity. In the first variant of the clamping means, the antenna coil of the circuit board 24 in the recess in the distal end side of the intermediate element forms, together with the RFID tag 15 in the recess in the proximal end side of the clamping means, a metal-protected radio link 27.2. In the second variant of the clamping means, a metal-protected radio link is formed between the two antenna coils of the circuit boards 24 (embodied in an identical fashion) in the recesses in the distal end side of the intermediate element and in the proximal end side of the clamping means.

A cylindrical recess 12.2 with an annular circuit board 24 of the type described above is also located in the distal end side of the workpiece spindle 5. The antenna coil of the circuit board 24 is located axially opposite the antenna coil of the circuit board in the proximal end side of the intermediate element 7.2 and forms a further metal-protected radio link 27.3 with the latter.

A coaxial cable runs from the annular circuit board 24 in the distal end side of the workpiece spindle 5 through the workpiece spindle 5 to a further annular circuit board 23.5. The latter is held in the region of the proximal end-side end of the workpiece spindle 5 between non-conductive retaining elements 9.7 and 9.8 (FIG. 17). A further circuit board 23.4 is arranged on a component which is fixed to the housing, and is secured fixed to the housing between non-conductive retaining elements 9.7 and 9.9. Antenna coils, which are arranged in a common plane n2, are formed on the circuit boards 23.5 and 23.4. The antenna coil of the circuit board 23.4 surrounds the antenna coil of the circuit board 23.5 radially. The radio link which is produced in this way is arranged in a cavity which is bounded by the workpiece spindle 5, an attachment part 7.1 attached thereto, and the housing of the spindle. This radio link is as a result also protected by metal against interference.

Overall, a plurality of metal-protected radio links are therefore present in the region of the workpiece spindle, specifically in each pair of recesses 12.2 which are located opposite one another, and at the proximal end between the circuit boards 23.4 and 23.5.

The method of functioning is similar to that of the dressing device described above and is explained with reference to FIGS. 19 and 20. Signals pass from an RFID reader 33 via a cable 19.6 and a cable 19.5 to the antenna coil on the circuit board 23.4. The signals are transmitted in a wireless fashion via a metal-protected radio link to the antenna coil on the circuit board 23.5 at the proximal end of the workpiece spindle 5. From there, the signals pass via the cable 20.3 to the antenna coil on the circuit board 24 at the distal end of the workpiece spindle 5. From there, the signals are transmitted either via two further metal-protected radio links to the RFID tag 15 (first variant), or via three further metal-protected radio links to the RFID tag on the circuit board 22.3 (second variant). The transmission is possible even if the workpiece spindle 5 is rotating, since the transmission takes place from the fixed region of the machine to the spindle via antenna coils which are arranged coaxially with the rotational axis.

Overall, the transmission path from the RFID reader 33 to the assigned RFID tag is therefore formed by a combination of cable links and metal-protected radio links. In this way, the RFID tag can be reliably read under all operating conditions.

Of course, a multiplicity of modifications are possible. In particular, RFID tags can also be provided on interchangeable parts other than a dressing disk or a clamping means, for example on a grinding wheel etc. It is therefore possible, for example, to transmit data to a grinding wheel in the same way as in the case of a dressing disk. The individual radio links can, of course, be embodied in a way other than that illustrated here as long as it is ensured that the radio links are in each case located in a cavity which is surrounded essentially completely by conductive material. Instead of RFID tags with an integrated memory it is also possible to use transmission/reception units which are connected to a sensor, for example to a temperature sensor, pressure sensor, proximity sensor, acceleration sensor or angular acceleration sensor. A multiplicity of further modifications is possible.

LIST OF REFERENCE SYMBOLS

1 Dressing disk
2 Clamping means
2.1 Attachment part for clamping means
3 Dressing spindle
4. Housing for dressing device
5. Workpiece spindle
6.1 Housing part
6.2 End cap
7.1 Attachment part
7.2 Intermediate element
8 Servomotor
9.1 Retaining element
9.2 Retaining element 9.3 Retaining element
9.4 Retaining element
9.5 Retaining element
9.6 Retaining element
9.7 Retaining element
9.8 Retaining element
9.9 Retaining element
10 Bore
11 Cable retaining element
12.1 Recess
12.2 Recess
13 End face
14 RFID tag
15 RFID tag with integrated antenna
16 Capacitor
17 Metallic mini-socket
18 Metallic mini-plug
19.1 Coaxial cable
19.2 Coaxial cable
19.3 Coaxial cable
19.4 Coaxial cable
19.5 Coaxial cable
20.1 Coaxial cable
20.2 Coaxial cable
20.3 Coaxial cable
21 Antenna coil
22 First circuit board
22.1 Upper side
22.2 Underside
22.3 Circuit board
23 Circuit board
23.1 Upper side
23.2 Underside
23.3 Circuit board
23.4 Circuit board
23.5 Circuit board
24 Circuit board
24.1 Upper side
24.2 Underside
25 Circuit board
25.1 Upper side
25.2 Underside
25.3 Circuit board
26.1 Metal-protected radio link
26.2 Metal-protected radio link
27.1 Metal-protected radio link
27.2 Metal-protected radio link
27.3 Metal-protected radio link
28 Shrink-fit hose
29 Sealing air
30 Adhesive
31 Protective coating
32 Sealing compound
33 RFID reader
33.1 Reader input
33.2 Reader output
a Angular region
b Width of the annular face for the antenna windings
c Width of the annular circuit board
d1 Outer diameter of the circuit board
d2 Outer diameter of the circuit board
d3 Outer diameter of the circuit board
d4 Inner diameter of the circuit board
d5 Inner diameter of the circuit board
e Thickness of the circuit board
f1 Diameter of the cylindrical recess
f2 Diameter of the cylindrical recess
h Depth of the cylindrical recess
k Length of the radio link
m1 Distance from metal
m2 Distance from metal
n1 Antenna plane
n2 Antenna plane

The invention claimed is:

1. A machine tool, comprising:
a first component which comprises a first antenna coil for wireless signal transmission, and
at least one second component which is removably and/or movably arranged on the first component and comprises a second antenna coil for wireless signal transmission,
wherein the first component and the second component together bound a cavity, the cavity defining a boundary surface having a surface area, the cavity being surrounded completely by an electrically conductive material with exception of possible interruptions or openings in the boundary surface, such interruptions or openings covering an area of less than 10% of the surface area of the boundary surface, and
wherein the first antenna coil and the second antenna coil are arranged together in the cavity in order to permit wireless signal transmission between the first antenna coil and the second antenna coil.

2. The machine tool as claimed in claim 1, wherein the cavity is arranged in such a way that operating fluids of the machine tool cannot penetrate into the cavity.

3. The machine tool as claimed in claim 1, wherein the first antenna coil and the second antenna coil are at a distance of, everywhere, at least 1 mm from the surrounding electrically conductive material.

4. The machine tool as claimed in claim 1, wherein the first antenna coil defines a first coil axis, wherein the second antenna coil defines a second coil axis, and wherein the first coil axis and the second coil axis coincide.

5. The machine tool as claimed in claim 4, wherein the first antenna coil has a first diameter, wherein the second antenna coil has a second diameter, and wherein the cavity has a maximum internal diameter which is not larger than 1.5 times the larger value of the first diameter and the second diameter.

6. The machine tool as claimed in claim 4, wherein signals are transmitted between the first antenna coil and the second antenna coil essentially in an axial direction.

7. The machine tool as claimed in claim 4, wherein the first antenna coil and the second antenna coil are located essentially axially opposite one another.

8. The machine tool as claimed in claim 4, wherein signals are transmitted between the first antenna coil and the second antenna coil essentially in a radial direction.

9. The machine tool as claimed in claim 4, wherein the first antenna coil surrounds the second antenna coil radially, or wherein the second antenna coil surrounds the first antenna coil radially.

10. The machine tool as claimed in claim 1, wherein the first and second components are rotatable relative to one another about a rotational axis, and wherein the first antenna coil and the second antenna coil are arranged in such a way that signals can be transmitted in a wireless fashion between the first antenna coil and the second antenna coil both in the stationary state and during a rotation of the second component with respect to the first component.

11. The machine tool as claimed in claim 1, wherein the first and second components are rotatable relative to one another about a rotational axis, wherein the first antenna coil defines a first coil axis, wherein the second antenna coil defines a second coil axis, and wherein the first coil axis and the second coil axis correspond to the rotational axis.

12. The machine tool as claimed in claim 1, wherein the first and second components together are rotatable with respect to a machine base about a rotational axis, and wherein the cavity is arranged concentrically with respect to the rotational axis or in a decentralized fashion at a distance from the rotational axis.

13. The machine tool as claimed in claim 1,
wherein at least the first component has a region made of electrically conductive material with a cylindrical recess,
wherein the cylindrical recess defines a cylinder axis and has an opening toward a surface of the first component,
wherein the first antenna coil is arranged concentrically with respect to the cylinder axis in a region of the cylindrical recess which is near to the opening, and
wherein the cylindrical recess is closed by the second component to form the cavity.

14. The machine tool as claimed in claim 13, wherein the cylindrical recess has a depth of 4-10 mm in the axial direction.

15. The machine tool as claimed in claim 13, wherein the cylindrical recess forms an opening in an end face of the component, and wherein the first antenna coil is at a clearance of at maximum 2 mm from the opening of the cylindrical recess.

16. The machine tool as claimed in claim 13, wherein a cylindrical region of the second component made of electrically conductive material, preferably metal, extends into the cylindrical recess, in order to close the cylindrical recess with respect to the cavity.

17. The machine tool as claimed in claim 16, wherein a bore with a reduced diameter adjoins the cylindrical recess in the axial direction, and wherein the cylindrical region of the second component extends into the bore.

18. The machine tool as claimed in claim 13, wherein the cylindrical recess is potted with an electrically insulating sealing compound.

19. The machine tool as claimed in claim 13,
wherein the second component has a region made of electrically conductive material with a second cylindrical recess which is open toward the first component,
wherein the first cylindrical recess and the second cylindrical recess define a common cylinder axis and are located one opposite the other in such a way that together they bound a cylindrical cavity, and
wherein the first antenna coil and the second antenna coil are arranged concentrically with respect to the common cylinder axis in the cavity and are located axially opposite one another or surround one another radially.

20. The machine tool as claimed in claim 1, wherein the first and/or second antenna coil are arranged in the form of one or more printed windings on an electrically insulating, annular circuit board with a central opening.

21. The machine tool as claimed in claim 20, wherein at least one electrical or electronic element is mounted on the annular circuit board, and wherein all such electrical or electronic elements are arranged on a side of the annular circuit board facing away from the windings.

22. The machine tool as claimed in claim 20, wherein the annular circuit board is glass-fiber-reinforced.

23. The machine tool as claimed in claim 1, wherein the machine tool comprises at least one electronic transmission and/or reception module which is electrically connected to the first or second antenna coil and which has a transmission and/or reception frequency of more than 5 MHz.

24. The machine tool as claimed in claim 23, wherein the electronic transmission and/or reception module is an RFID component.

25. The machine tool as claimed in claim 1,
wherein an interchangeable third component is connected to the second component;
wherein the second component comprises a third antenna coil which is electrically connected to the second antenna coil;
wherein the third component comprises a fourth antenna coil;
wherein the second component and the third component together define a further cavity which is surrounded essentially completely by an electrically conductive material and
wherein the third antenna coil and the fourth antenna coil are arranged together in the further cavity in order to permit wireless signal transmission between the third antenna coil and the fourth antenna coil.

26. The machine tool as claimed in claim 25, wherein the second and the third antenna coils are connected by means of at least one cable which runs completely in the interior of the second component.

27. The machine tool as claimed in claim 1, wherein the electrically conductive material is a metal.

28. A component of a machine tool,
the component comprising an antenna coil for wireless signal transmission, the antenna coil defining a coil axis,
the component having a region made of electrically conductive material with a cylindrical recess, the cylindrical recess defining a cylinder axis and being open toward a surface of the component, and
the antenna coil in the cylindrical recess being arranged concentrically with respect to the cylinder axis,
wherein the cylindrical recess is potted with an electrically insulating sealing compound.

29. The component as claimed in claim 28, wherein the cylindrical recess has a depth of 4-10 mm in the axial direction.

30. The component as claimed in claim 28, wherein the cylindrical recess forms an opening in an end face of the component, and wherein the antenna coil is at a clearance of at maximum 2 mm from the opening of the cylindrical recess.

31. The component as claimed in claim 28, wherein the component is configured to be arranged on the machine tool so as to be rotatable about a rotational axis, and wherein the cylindrical axis corresponds to the rotational axis.

32. The component as claimed in claim 31, wherein a central bore with reduced diameter adjoins in the axial direction an end of the cylindrical recess which is remote from the opening.

33. The component as claimed in claim 28, comprising an RFID transponder which is electrically connected to the antenna coil.

34. The component as claimed in claim 33, wherein the RFID transponder has a transmission and/or reception frequency of more than 5 MHz.

35. The component as claimed in claim 28,
wherein the component comprises a further antenna coil;
wherein the two antenna coils are electrically connected by means of at least one cable, preferably a coaxial cable; and wherein the cable runs completely in the interior of the component.

36. The component as claimed in claim 35, wherein the cable runs through a cable guide bore which is filled with a sealing compound.

37. The component as claimed in claim 36, wherein the cable is loosely surrounded by a hose, with the result that the cable is strain-relieved when the sealing compound cures.

38. The component as claimed in claim 36, wherein the component is configured to be arranged on the machine tool so as to be rotatable about a rotational axis, wherein the cable guide bore runs at least in one region in a decentralized fashion at a distance from the rotational axis, and wherein the component has a compensation bore which is configured essentially identically to the cable guide bore, runs offset with respect to the cable guide bore by 180° in relation to the rotational axis and is also filled with the sealing compound.

39. The component as claimed in claim 28, wherein the electrically conductive material is a metal.

40. A component of a machine tool,
the component comprising an antenna coil for wireless signal transmission, the antenna coil defining a coil axis,
the component having a region made of electrically conductive material with a cylindrical recess, the cylindrical recess defining a cylinder axis and being open toward a surface of the component, and
the antenna coil in the cylindrical recess being arranged concentrically with respect to the cylinder axis,
wherein the component comprises a further antenna coil;
wherein the two antenna coils are electrically connected by means of at least one cable; and
wherein the cable runs completely in the interior of the component.

41. The component as claimed in claim 40, wherein the cable runs through a cable guide bore which is filled with a sealing compound.

42. The component as claimed in claim 41, wherein the cable is loosely surrounded by a hose, with the result that the cable is strain-relieved when the sealing compound cures.

43. The component as claimed in claim 41, wherein the component is configured to be arranged on the machine tool so as to be rotatable about a rotational axis, wherein the cable guide bore runs at least in one region in a decentralized fashion at a distance from the rotational axis, and wherein the component has a compensation bore which is configured essentially identically to the cable guide bore, runs offset with respect to the cable guide bore by 180° in relation to the rotational axis and is also filled with the sealing compound.

44. A component of a machine tool,
the component comprising an antenna coil for wireless signal transmission, the antenna coil defining a coil axis,
the component having a region made of electrically conductive material with a cylindrical recess, the cylindrical recess defining a cylinder axis and being open toward a surface of the component, and
the antenna coil in the cylindrical recess being arranged concentrically with respect to the cylinder axis,
wherein the component is configured to be arranged on the machine tool so as to be rotatable about a rotational axis, and
wherein the cylindrical recess is arranged in a decentralized fashion at a distance from the rotational axis.

45. The component as claimed in claim 44, wherein the cylindrical recess is potted with an electrically insulating sealing compound.

46. The component as claimed in claim 44, comprising an RFID transponder which is electrically connected to the antenna coil.

47. The component as claimed in claim 46, wherein the RFID transponder has a transmission and/or reception frequency of more than 5 MHz.

* * * * *